(12) United States Patent
Ishibashi

(10) Patent No.: US 8,146,346 B2
(45) Date of Patent: Apr. 3, 2012

(54) $NO_x$ TRAPPING CATALYTIC CONVERTER DIAGNOSTIC APPARATUS

(75) Inventor: Yasutaka Ishibashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 750 days.

(21) Appl. No.: 12/048,655

(22) Filed: Mar. 14, 2008

(65) Prior Publication Data

US 2008/0229730 A1  Sep. 25, 2008

(30) Foreign Application Priority Data

Mar. 19, 2007 (JP) ................................. 2007-070400

(51) Int. Cl.
*F01N 3/00* (2006.01)
(52) U.S. Cl. ................ 60/277; 60/274; 60/295; 60/297; 60/311
(58) Field of Classification Search ..................... 60/274, 60/277, 295, 297, 311
See application file for complete search history.

(56) References Cited

U.S. PATENT DOCUMENTS

| | | | |
|---|---|---|---|
| 6,912,847 B2 * | 7/2005 | Deeba ............................. | 60/297 |
| 7,082,752 B2 * | 8/2006 | Plote et al. ...................... | 60/277 |
| 7,159,384 B2 * | 1/2007 | Otake et al. ..................... | 60/277 |
| 7,347,043 B2 * | 3/2008 | Tahara et al. ................... | 60/297 |
| 7,721,528 B2 * | 5/2010 | Odajima et al. ................. | 60/277 |
| 2004/0139729 A1 | 7/2004 | Taylor, III et al. | |
| 2005/0022505 A1 | 2/2005 | Kitahara | |
| 2006/0053778 A1 | 3/2006 | Asanuma et al. | |
| 2006/0242945 A1 * | 11/2006 | Wang et al. ..................... | 60/277 |
| 2010/0101213 A1 * | 4/2010 | Tuomivaara et al. ........... | 60/276 |

FOREIGN PATENT DOCUMENTS

| | | |
|---|---|---|
| EP | 1745836 | 1/2007 |
| JP | 2000-104536 | 4/2000 |

* cited by examiner

*Primary Examiner* — Binh Q Tran
(74) *Attorney, Agent, or Firm* — Global IP Counselors, LLP

(57) ABSTRACT

A NOx trapping catalytic converter diagnostic apparatus basically has a particulate matter accumulation estimating component, a particulate matter accumulation detecting component and a deterioration determining component. The particulate matter accumulation estimating component is configured to estimate an estimated amount of particulate matter accumulated a particulate matter filter that is positioned downstream of a NOx trapping catalytic converter. The particulate matter accumulation detecting component is configured to detect a detected amount of particulate matter accumulated in the particulate matter filter. The deterioration determining component is configured to determine if deterioration of the NOx trapping catalytic converter has occurred based on the estimated amount of accumulated particulate matter and the detected amount of accumulated particulate matter without using a NOx sensor to determine if the NOx trapping catalytic converter has deteriorated.

15 Claims, 4 Drawing Sheets

NO$_x$ TRAPPING CATALYTIC CONVERTER DIAGNOSTIC APPARATUS

CROSS-REFERENCE TO RELATED APPLICATIONS

This application claims priority to Japanese Patent Application No. 2007-070400, filed on Mar. 19, 2007. The entire disclosure of Japanese Patent Application No. 2007-070400 is hereby incorporated herein by reference.

BACKGROUND OF THE INVENTION

1. Field of the Invention

The present invention generally relates to a diagnostic apparatus for a NOx trapping catalytic converter. More specifically, the present invention relates to a diagnostic apparatus for a NOx trapping catalytic converter that can determine if a NOx trapping catalytic converter is deteriorated.

2. Background Information

There is a NOx trapping catalytic converter diagnostic technology configured to determine if the catalyst of a NOx trapping catalytic converter is deteriorated based on a signal from a NOx sensor arranged downstream of the NOx trapping catalytic converter. An example of such a NOx trapping catalytic converter diagnostic technology is disclosed in Japanese Laid-Open Patent Publication No. 2000-104536

In view of the above, it will be apparent to those skilled in the art from this disclosure that there exists a need for an improved a NOx trapping catalytic converter diagnostic apparatus. This invention addresses this need in the art as well as other needs, which will become apparent to those skilled in the art from this disclosure.

SUMMARY OF THE INVENTION

One object of the present invention is to provide a NOx trapping catalytic converter diagnostic apparatus that can determine if a NOx trapping catalytic converter is deteriorated.

In view of the above, a NOx trapping catalytic converter diagnostic apparatus is provided that basically comprises a particulate matter accumulation estimating component, a particulate matter accumulation detecting component and a deterioration determining component. The particulate matter accumulation estimating component is configured to estimate an estimated amount of the particulate matter accumulated a particulate matter filter that is positioned downstream of a NOx trapping catalytic converter. The particulate matter accumulation detecting component is configured to detect a detected amount of particulate matter accumulated in the particulate matter filter. The deterioration determining component is configured to determine if deterioration of the NOx trapping catalytic converter has occurred based on the estimated amount of accumulated particulate matter and the detected amount of accumulated particulate matter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
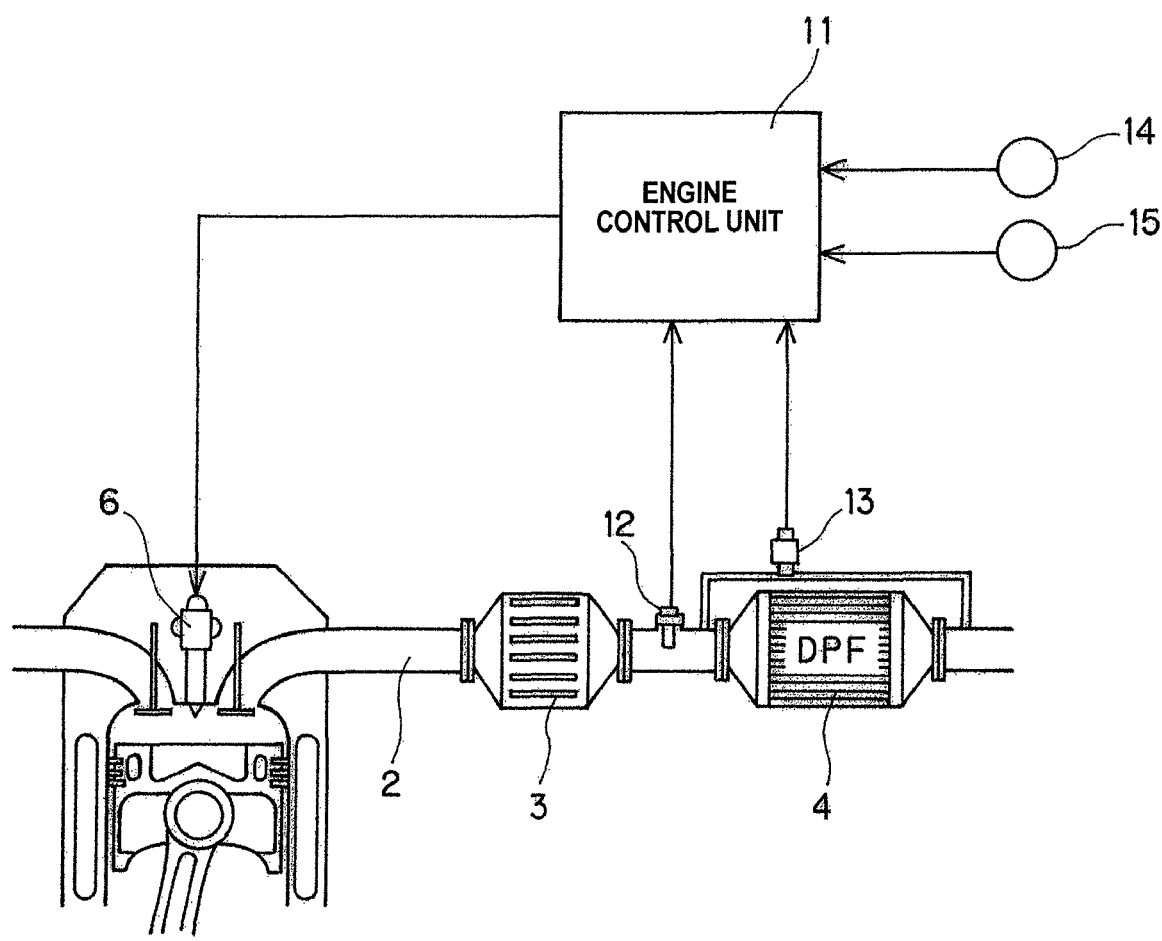
FIG. 1 is a schematic block diagram of an internal combustion engine (e.g., a diesel engine) with an exhaust gas cleaning apparatus including a NOx trapping catalytic converter diagnostic apparatus in accordance with a first embodiment.

Referring initially to FIG. 1, an internal combustion engine 1 (e.g., a diesel engine) is illustrated with an exhaust gas cleaning apparatus including a NOx trapping catalytic converter diagnostic apparatus in accordance with a first embodiment. The diesel engine 1 shown in FIG. 1 is configured to operate in a region where the excess air ratio is larger than 1, i.e., with an air fuel mixture containing excess air. Consequently, a large amount of NOx is contained in the exhaust gas. When the engine load increases, the fuel injection quantity increases and the air utilization rate worsens, causing particulate matter to be contained in the exhaust gas. The diesel engine 1 of this type is well known in the art. Since diesel engines of this type are well known in the art, the precise structure of the diesel engine 1 will not be discussed or illustrated in detail herein.

The diesel engine 1 has exhaust gas passage 2 to expel the exhaust gas from the combustion chamber of the diesel engine 1. In order to clean the NOx and the particulate matter from the exhaust gas, a three-way trapping catalytic converter 3 having a NOx trapping function (hereinafter called "NOx trapping catalytic converter") and a particulate matter filter 4 are arranged in the exhaust gas passage 2. The NOx trapping catalytic converter 3 is arranged upstream of the particulate matter filter 4. The NOx trapping catalytic converter is configured to adsorb and store NOx contained in the exhaust gas when an air fuel ratio of the exhaust gas is leaner than a stoichiometric air fuel ratio and to release the stored NOx with a reduction reaction when the air fuel ratio of the exhaust gas is richer than the stoichiometric air fuel ratio. When the stored NOx is released, it is cleaned in a reduction reaction by using HC and CO as reduction agents. HC and CO exist in large quantities in the exhaust gas. The three-way catalyst functions to accomplish this reduction cleaning of the NOx.

The particulate matter filter 4 serves to capture particulate matter contained in the exhaust gas and has, for example, a honeycomb wall structure. In such a filter, many generally parallel flow passages are provided with the inlets of alternating flow passages being blocked, and with the outlets of the flow passages whose inlets are open (not blocked) being blocked. The passages are separated by filter walls and the particulate matter filter 4 is configured such that the exhaust gas must pass through the particulate matter filter walls. Since the particulate matter born by the exhaust gas cannot pass through the particulate matter filter walls, it is captured by the membranes of the particulate matter filter 4.

Thus, in this illustrated embodiment, the NOx trapping catalytic converter 3 and the particulate matter filter 4 are arranged in the exhaust passage 2 to form an engine exhaust gas cleaning apparatus. The exhaust gas cleaning apparatus further includes an engine control unit 11, an exhaust gas temperature sensor 12, a pressure difference sensor 13, an engine speed sensor 14 and an accelerator sensor 15 such that exhaust gas cleaning apparatus further includes a NOx trapping catalytic converter diagnostic apparatus. The NOx trapping catalytic converter diagnostic apparatus determines if the NOx trapping catalytic converter 3 has deteriorated without the need to provide a NOx sensor.

The principles on which the deterioration determination of the NOx trapping catalytic converter 3 is based will now be explained. The NOx discharged from the engine 1 is oxidized into nitrogen dioxide ($NO_2$) by the NOx trapping catalytic converter 3 and the nitrogen dioxide ($NO_2$) is stored in the NOx trapping catalytic converter 3. As the deterioration of the NOx trapping catalytic converter 3 progresses, the amount of nitrogen dioxide ($NO_2$) stored in the catalyst decreases and the amount of nitrogen dioxide ($NO_2$) discharged from the NOx trapping catalytic converter 3 increases. Meanwhile, when the exhaust gas temperature is approximately 450° C., a portion of the particulate matter captured in the particulate matter filter 4 positioned downstream of the NOx trapping catalytic converter 3 is removed by oxidization in which the nitrogen dioxide ($NO_2$) contained in the exhaust gas flowing from upstream functions as an oxidizing agent. If the amount of nitrogen dioxide ($NO_2$) flowing into the particulate matter filter 4 (i.e., the amount of nitrogen dioxide flowing out of the NOx trapping catalytic converter 3) increases, then the amount of particulate matter removed from the particulate matter filter 4 by oxidation will increase. In short, the larger the amount of particulate matter removed from the particulate matter filter 4 by oxidation is, the larger the amount of nitrogen dioxide ($NO_2$) discharged from the NOx trapping catalytic converter 3 can be determined to be. Thus, when the amount of particulate matter removed from the particulate matter filter 4 by oxidation exceeds a prescribed value (determination threshold value), it can be determined that the NOx trapping catalytic converter 3 is deteriorated. The NOx trapping catalytic converter diagnostic apparatus determines if the NOx trapping catalytic converter 3 is deteriorated based on the amount of particulate matter flowing into the particulate matter filter 4 and the amount of particulate matter accumulating in the particulate matter filter 4, i.e., based on a summation value (estimate value) of the amount of particulate matter entering the particulate matter filter 4 per prescribed amount of time and an increase (detection value) in the amount of particulate matter accumulating in the particulate matter filter 4 per the same prescribed amount of time.

Thus, the determination as to whether or not the NOx trapping catalytic converter 3 is deteriorated is accomplished by the engine control unit 11 based on the following signals fed to the engine control unit 11 by sensors 12 to 15. The engine control unit 11 receives an exhaust gas temperature signal from the exhaust gas temperature sensor 12, which is provided upstream of the particulate matter filter 4. The engine control unit 11 receives pressure difference signal from the pressure difference sensor 13, which is configured to measure a pressure difference across the particulate matter filter 4. The engine control unit 11 receives a rotational speed signal from the engine speed sensor 14. The engine control unit 11 receives an accelerator position signal from the accelerator sensor 15.

Basically, the NOx trapping catalytic converter diagnostic apparatus of the illustrated embodiment accomplishes the determination as to whether or not the NOx trapping catalytic converter has deteriorated based on a calculation of the amount of particulate matter that flows into the particulate matter filter 4 and an estimate of the amount of particulate matter that has accumulated in the particulate matter filter 4. Thus, the NOx trapping catalytic converter diagnostic apparatus can diagnose whether or not the NOx trapping catalytic converter is deteriorated without using a NOx sensor in the determination.

The control processing executed by the engine control unit 11 in order to determine if the NOx trapping catalytic converter 3 is deteriorated, without using a NOx sensor, will now be explained with reference to the flowchart of FIG. 2. The flowchart of FIG. 2 indicates the flow of the processing steps over time, but does not indicate a control sequence that is executed repeatedly once per prescribed amount of time.

In Step S1 the engine control unit 11 reads the exhaust gas temperature Tex detected by the temperature sensor 12. In Step S2, the engine control unit 11 determines if the exhaust gas temperature Tex is in a prescribed temperature region between a lower limit value A and an upper limit value B. The prescribed temperature region is an exhaust gas temperature region in which nitrogen dioxide ($NO_2$) discharged from the NOx trapping catalytic converter 3 causes particulate matter captured by the particulate matter filter 4 to be removed by oxidation. Additionally, the prescribed temperature region is set to an exhaust gas temperature region in which a conversion efficiency of the NOx trapping catalytic converter 3 changes greatly when deterioration of the NOx trapping catalytic converter 3 occurs, thus enabling a deterioration determination to be accomplished. The reason a temperature region in which the conversion efficiency of the NOx trapping catalytic converter 3 changes greatly is used is to improve the accuracy with which deterioration of the NOx trapping catalytic converter 3 is detected. For example, it is acceptable to set the lower limit value A to approximately 300° C. and the upper limit value B to approximately 450° C.

If the exhaust gas temperature Tex is not in the prescribed temperature region ($A \leq Tex \leq B$), then the engine control unit 11 returns to Steps S1 and S2 and waits until the condition $A \leq Tex \leq B$ is satisfied. When the exhaust gas temperature Tex enters the prescribed temperature region, the engine control unit 11 proceeds to Step S3 and subsequent steps because it is possible to determine whether or not the NOx trapping catalytic converter 3 is deteriorated.

Depending on the operating conditions, it is possible that the exhaust gas temperature Tex will not enter the prescribed temperature region. In such a case, if an intake throttle valve is provided in an intake passage, then the exhaust gas temperature can be adjusted into the prescribed temperature region by closing the intake throttle valve so as to throttle the intake air and by retarding the fuel injection timing of a fuel injection valve 6.

In this embodiment, a case is considered in which the exhaust gas temperature Tex is not initially in the prescribed temperature region ($A \leq Tex \leq B$) but then enters the prescribed temperature region due to a change in operating conditions and remains in the prescribed temperature region for a while (a time longer than a prescribed amount of time T1 explained later).

In Steps S3 and S4, the engine control unit 11 detects a particulate accumulation amount S1 of the particulate matter filter 4 at the time when the exhaust gas temperature Tex entered the prescribed temperature. The pressure difference across the particulate matter filter 4 depends on the amount of particulate matter accumulated in the particulate matter filter 4. The pressure difference across the particulate matter filter 4 increases as the amount of particulate matter accumulated in the particulate matter filter 4 increases.

Figure 4:
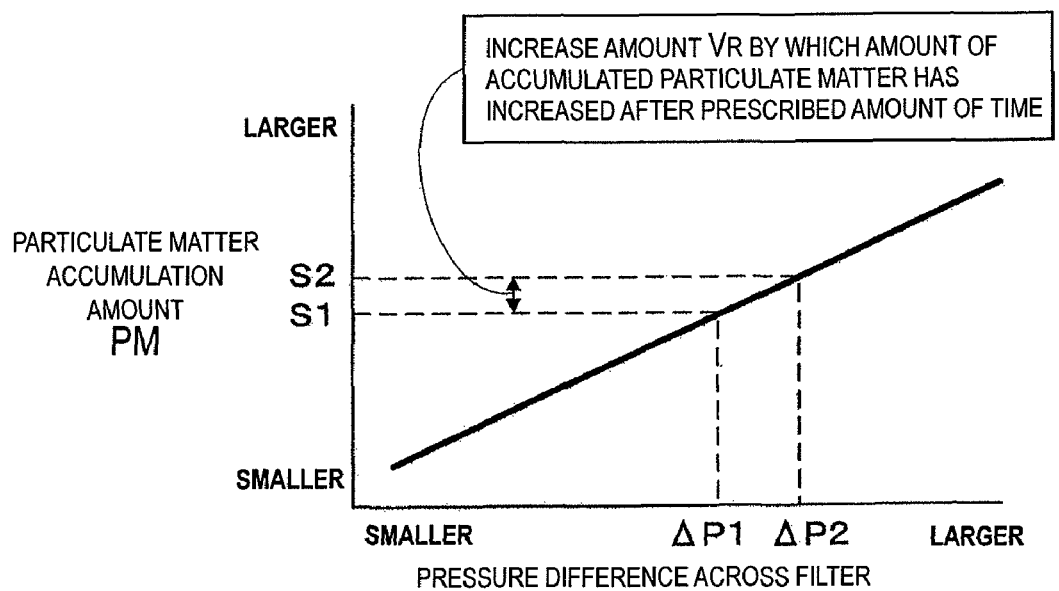
FIG. 4 is a characteristic diagram plotting the amount of particulate matter that accumulates in the particulate matter filter.

In Step S3, the engine control unit 11 reads the pressure difference $\Delta P1$ of the particulate matter filter 4 detected by the pressure difference sensor 13. Then, in Step S4, the engine control unit 11 detects the particulate accumulation amount S1 of the particulate matter filter 4 at the time when the exhaust gas temperature Tex entered the prescribed temperature in an indirect manner by searching a table of the content expressed in FIG. 4 based on the pressure difference $\Delta P1$. Since the value S1 will be necessary after a prescribed amount of time (explained later) has elapsed, it is stored in a memory for later use.

In Steps S5 to S7, the engine control unit 11 calculates a summation value of the amount of particulate matter (abbreviated as "PM" in the figures) that flows into the particulate matter filter 4 (i.e., the amount of particulate matter discharged from the engine 1) during a prescribed amount of time starting from the point in time when the condition of Step S2 is satisfied (i.e., the time when the exhaust gas temperature Tex enters the prescribed temperature region).

Figure 3:
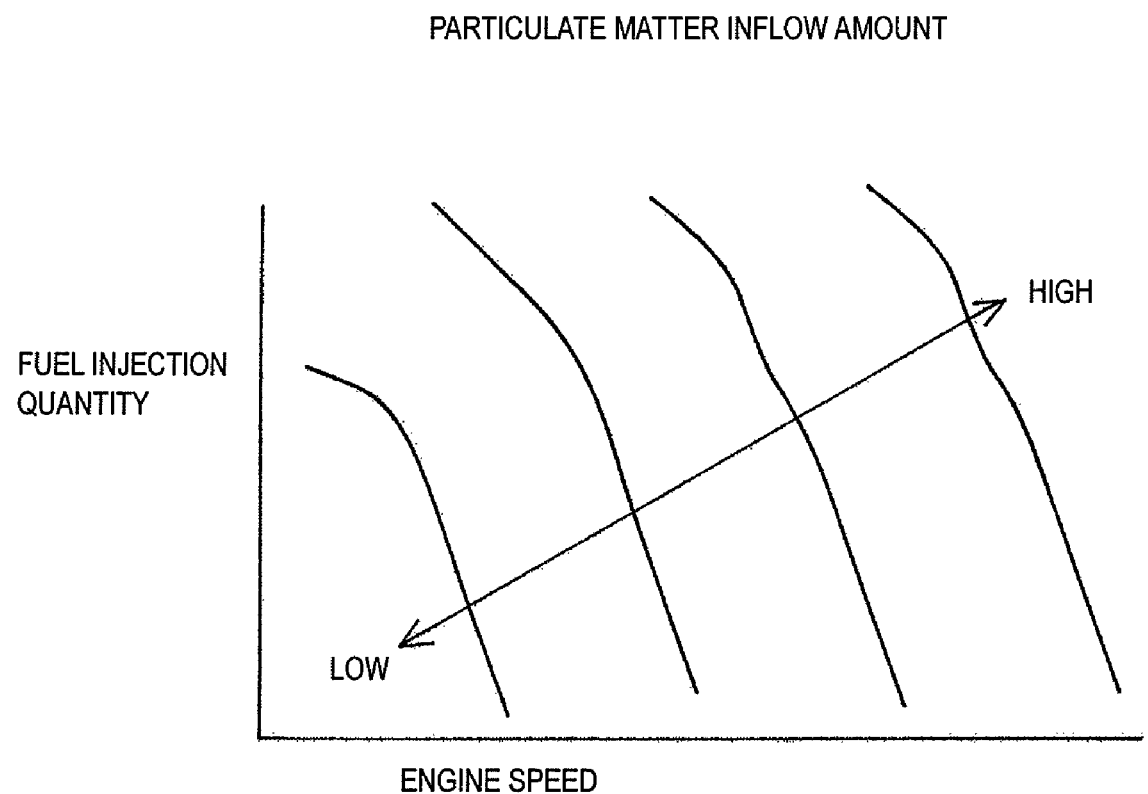
FIG. 3 is a characteristic diagram plotting the amount of particulate matter that flows into the particulate matter filter per control cycle.

More specifically, in Step S5, the engine control unit 11 estimates the amount of particulate matter flowing into the particulate matter filter 4 each time the engine control unit 11 repeats its control cycle by searching a map of the content shown in FIG. 3 based on an operating condition (e.g., engine speed and fuel injection quantity) existing at that time.

In Step S6, the engine control unit 11 estimates a summation value Ve of the amount of particulate matter flowing in during the prescribed amount of time by calculating a summation of the values estimated in Step S5. The fuel injection quantity mentioned above is calculated using a control sequence that is not shown in the figures to search a prescribed map based on the engine speed detected by the engine speed sensor 14 and the accelerator position detected by the accelerator sensor 15.

In Step S7, the engine control unit 11 determines if the prescribed amount of time T1 has elapsed since the time when the condition of Step S2 was satisfied. If the prescribed amount of time T1 has not yet elapsed since the time when the condition of Step S2 was satisfied, the engine control unit 11 repeats Steps S5 and S6. The amount of particulate matter flowing into the particulate matter filter 4 per control cycle time (e.g., 10 ms) can be calculated by preparing a map of the amount of particulate matter flowing in per control cycle time and searching the prepared map (map shown in FIG. 3) each time Steps S5 and S6 are repeated (e.g., every 10 ms). The summation value Ve of the amount of particulate matter that flowed into the particulate matter filter 4 during the prescribed amount of time T1 (which started when the condition of Step S2 was satisfied) can then be calculated by summing the all of the individual particulate matter inflow amounts per control cycle time calculated for each control cycle.

When the prescribed amount of time T1 has elapsed since the condition of Step S2 was satisfied, an amount of particulate matter corresponding to the summation value Ve (calculated amount of particulate matter captured during the prescribed amount of time) should have been newly captured by the particulate matter filter 4. Thus, the amount of accumulated particulate matter in the particulate matter filter 4 should be larger than before the prescribed amount of time T1 elapsed. However, if a portion of the particulate matter accumulated in the particulate matter filter 4 is removed by oxidation resulting from nitrogen dioxide ($NO_2$) discharged from the NOx trapping catalytic converter 3, then an increase amount Vr (actual value) by which the amount of particulate matter accumulated in the particulate matter filter 4 actually increased during the prescribed amount of time will be smaller than the summation value (computed value) described above.

Therefore, after the prescribed amount of time T1 has elapsed since the condition of Step S2 is satisfied, the engine control unit 11 proceeds to Steps S8, S9, and S10 from Step S7 and calculates the increase amount Vr by which the amount of particulate matter accumulated in the particulate matter filter 4 actually increased during the prescribed amount of time T1 after the condition of Step S2 was satisfied. More specifically, in Step S8 the engine control unit 11 reads the pressure difference $\Delta P2$ across the particulate matter filter 4 detected by the pressure difference sensor 13, and in Step S9 the engine control unit 11 calculates (estimates) the amount S2 of particulate matter accumulated in the particulate matter filter 4 after the prescribed amount of time T1 elapsed by searching a table of the content shown in FIG. 4 based on the pressure difference $\Delta P2$. Then, by subtracting the particulate matter accumulation amount S1 (amount of particulate matter accumulated before the prescribed amount of time elapsed) from the particulate matter accumulation amount S2 (amount of particulate matter accumulated after the prescribed amount of time elapsed), the engine control unit 11 calculates (estimates) the increase amount Vr (=S2−S1) by which the amount of particulate matter accumulated in the particulate matter filter 4 increased during the prescribed amount of time T1.

Figure 5:
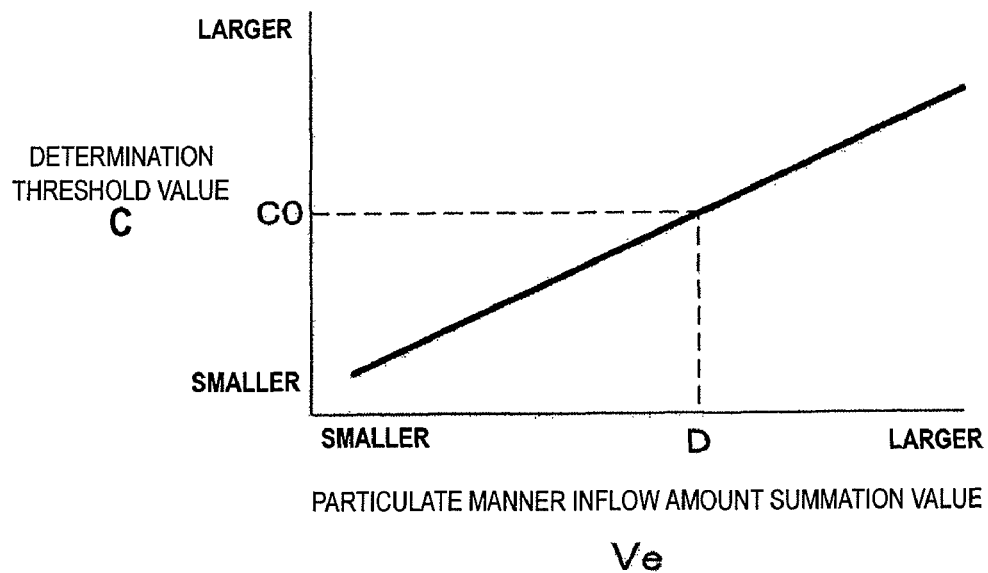
FIG. 5 is a characteristic diagram plotting a determination threshold value.

In Step S11, a deterioration determination threshold value C is calculated by searching a table of the content shown in FIG. 5 based on the summation value Ve calculated in Step S6 indicating the amount of particulate matter that flowed into the particulate matter filter 4 during the prescribed amount of time T1. The amount of particulate matter removed by oxidation with nitrogen dioxide ($NO_2$) changes depending on the summation value Ve of the amount of particulate matter that flowed into the particulate matter filter 4 during the prescribed amount of time. In other words, the amount of particulate matter removed by oxidation is larger when the summation value Ve of the amount of particulate matter that flowed into the particulate matter filter 4 during the prescribed amount of time is large, than when the summation value Ve is small. Therefore, the deterioration determination threshold value C is set to change according to the summation value Ve of the amount of particulate matter that flows into the particulate matter filter 4 during the prescribed amount of time.

The increase amount Vr by which the amount of particulate matter accumulated in the particulate matter filter 4 increased during the prescribed amount of time T1 is subtracted from the summation value Ve of the amount of particulate matter that flowed into the particulate matter filter 4 during the prescribed amount of time T1 to obtain a difference $\Delta PM$ (=Ve−Vr). The difference $\Delta PM$ is dependent on the amount of nitrogen dioxide $NO_2$ discharged from the NOx trapping catalytic converter 3. The more the NOx trapping catalytic converter 3 degrades, the larger the amount of nitrogen dioxide ($NO_2$) discharged from the NOx trapping catalytic converter 3 becomes and, thus, the difference $\Delta PM$ increases. By comparing the difference $\Delta PM$ to the determination threshold value C, the NOx trapping catalytic converter 3 can be determined not to be deteriorated if the difference $\Delta PM$ is equal to or smaller than the determination threshold value C and to be deteriorated if the difference $\Delta PM$ is larger than the determination threshold value C. Therefore, in Step S12, the difference ΔPM is compared to the determination threshold value C. If the difference ΔPM is larger than the determination threshold value C, then the engine control unit 11 determines that deterioration of the NOx trapping catalytic converter 3 exists and proceeds to Step S13, where it sets the value of a catalyst deterioration flag to 1 (the value of the catalyst deterioration flag being initially set to zero when the engine is started). Conversely, if the difference ΔPM is equal to or smaller than the determination threshold value C, then the engine control unit 11 proceeds to Step S14 and sets the catalyst deterioration flag to 0.

Figure 2:
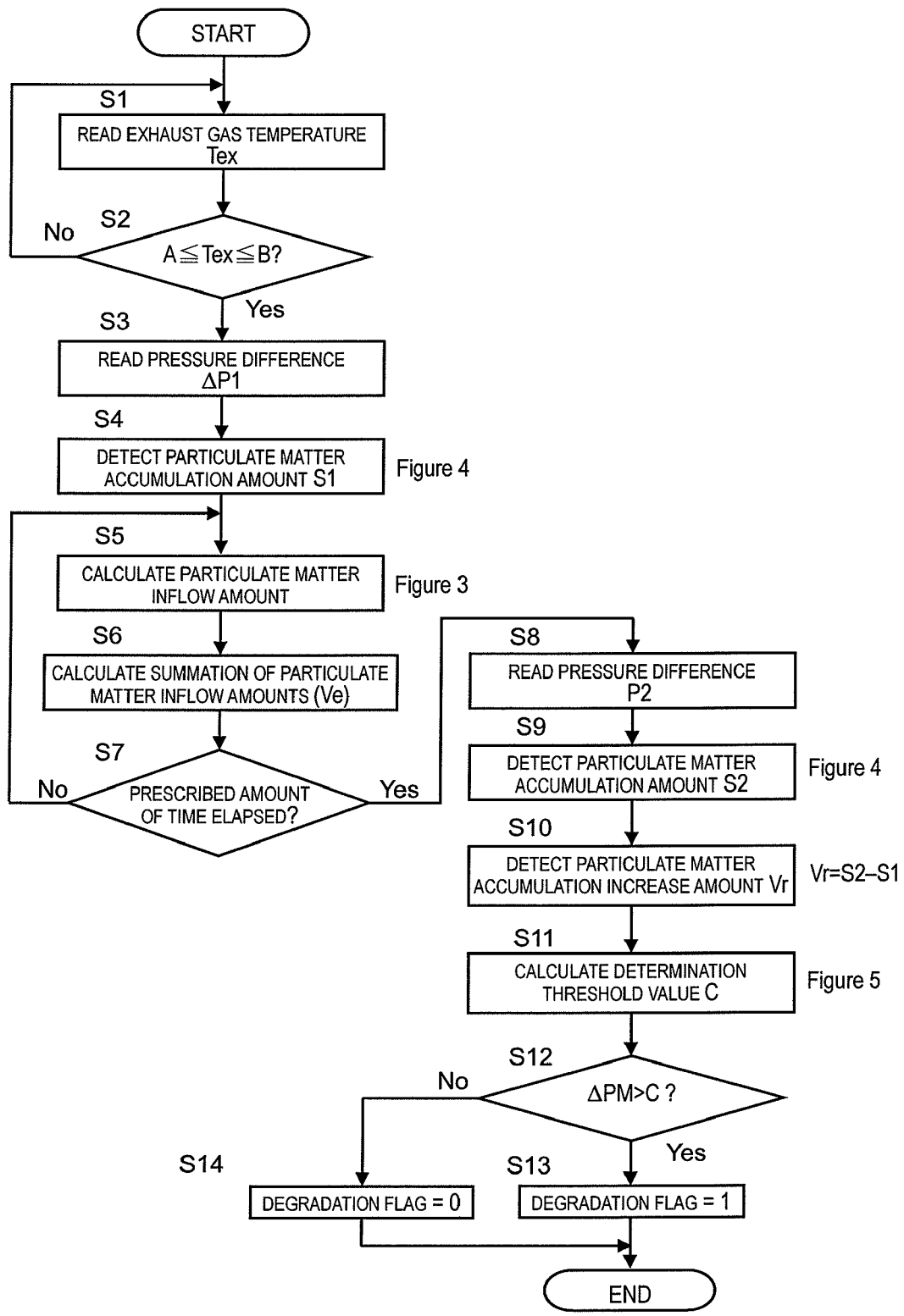
FIG. 2 is a flowchart of the control routine executed by the control unit to determine if the NOx trapping catalytic converter has deteriorated.

When the flowchart of FIG. 2 is executed while the NOx trapping catalytic converter 3 is new and the summation value Ve of the amount of particulate matter that has flowed into the particulate matter filter 4 is found to be at a reference summation value D when the condition of Step S2 is satisfied, the difference ΔPM will be at a prescribed value Cini that is not zero. This occurs because even when the NOx trapping catalytic converter 3 is new, a small amount of nitrogen dioxide ($NO_2$) is discharged from the NOx trapping catalytic converter 3 and this discharged nitrogen dioxide causes a portion of the particulate matter accumulated in the particulate matter filter 4 to be oxidized. Consequently, the increase amount Vr by which the amount of particulate matter accumulated in the particulate matter filter 4 increased during the prescribed amount of time is smaller than the summation value Ve (computed value) of the amount of particulate matter that flowed into the particulate matter filter 4 during the prescribed amount of time. Thus, by establishing a reference determination threshold value C0 calculated by adding a tolerance value ε to the prescribed value Cini, the apparatus can be configured to determine that the NOx trapping catalytic converter 3 is deteriorated when the difference ΔPM is larger than the reference determination value C0

Deterioration of the NOx trapping catalytic converter 3 can only be determined accurately using the determination threshold value C0 when the summation value Ve of the amount of particulate matter that flowed into the particulate matter filter 4 during the prescribed amount of time equals the reference summation value D. When the summation value Ve does not equal the reference summation value D due to a difference in the operating conditions, the determination threshold value C0 is not an appropriate value to use. However, by using FIG. 5, the catalyst deterioration determination can be executed accurately when the summation value Ve of the amount of particulate matter that flowed into the particulate matter filter 4 during the prescribed amount of time does not equal the reference summation value D. Thus, as indicated in FIG. 5, the determination threshold value C is set to a value larger than the reference determination threshold value C0 when the summation value Ve is larger than the reference summation value D. Meanwhile, the determination threshold value C is set to a value smaller than the reference determination threshold value C0 when the summation value Ve is smaller than the reference summation value D.

When the prescribed amount of time T1 is longer, the accuracy of the catalyst deterioration diagnosis is better but the opportunities to execute a catalyst deterioration diagnosis are fewer. Conversely, when the prescribed amount of time T1 is shorter, the number of opportunities to execute a catalyst deterioration diagnosis is larger but the accuracy of the catalyst deterioration diagnosis executed is lower. Therefore, the prescribed amount of time T1 is set to an appropriate value.

The operational effects of this embodiment of the NOx trapping catalytic converter diagnostic apparatus will now be explained. The NOx trapping catalytic converter diagnostic apparatus in accordance with this embodiment is used in an exhaust system having the NOx trapping catalytic converter 3 with the particulate matter filter 4 arranged downstream of the NOx trapping catalytic converter 3. The NOx trapping catalytic converter diagnostic apparatus calculates a summation value Ve of the amount of particulate matter that flows into the particulate matter filter 4 during a prescribed amount of time (indicating the detected amount of particulate matter that flows into the particulate matter filter) and estimates an increase amount Vr by which the amount of particulate matter accumulated in the particulate matter filter 4 increases during the prescribed amount of time (indicating the estimated amount of particulate matter that accumulates in the particulate matter filter). The NOx trapping catalytic converter diagnostic apparatus then determines if the NOx trapping catalytic converter 3 is deteriorated using the summation value Ve of the detected amount of particulate matter that flowed into the particulate matter filter 4 during the prescribed amount of time and the increase amount Vr by which the amount of particulate matter accumulated in the particulate matter filter 4 increased during the prescribed amount of time (see Steps S3 to S10 and Steps S12 to S13 of FIG. 2). As a result, the NOx trapping catalytic converter diagnostic apparatus can accomplish a deterioration diagnosis of the NOx trapping catalytic converter 3 without employing a NOx sensor.

In the NOx trapping catalytic converter diagnostic apparatus in accordance with the illustrated embodiment, the deterioration determining component calculates a difference ΔPM between the summation value Ve of the amount of particulate matter that flowed into the particulate matter filter 4 during the prescribed amount of time and the increase amount Vr by which the amount of particulate matter accumulated in the particulate matter filter 4 increased during the prescribed amount of time (ΔPM=Ve−Vr). The deterioration determining component then determines that the NOx trapping catalytic converter 3 is deteriorated if the difference ΔPM is larger than a determination threshold value C (see Steps S3 to S10 and Steps S12 to S14 of FIG. 2). As a result, deterioration of the NOx trapping catalytic converter 3 can be detected accurately even if the summation value Ve of the amount of particulate matter that flows into the particulate matter filter 4 during the prescribed amount of time varies.

In the illustrated embodiment, the determination threshold value C is determined in accordance with the summation value Ve of the amount of particulate matter that flows into the particulate matter filter 4 during the prescribed amount of time (see Step S11 of FIG. 2 and FIG. 5). As a result, the deterioration of the NOx trapping catalytic converter 3 can be detected accurately even if the summation value Ve of the amount of particulate matter that flows into the particulate matter filter 4 during the prescribed amount of time varies due to changes in an operating condition.

In an exhaust gas temperature region where the conversion efficiency of the NOx trapping catalytic converter 3 substantially does not change when the NOx trapping catalytic converter becomes deteriorated and in an exhaust gas temperature region where the nitrogen dioxide ($NO_2$) discharged from the NOx trapping catalytic converter 3 does not cause particulate matter accumulated in the particulate matter filter 4 to be removed by oxidation, the difference ΔPM (between the summation value Ve of the amount of particulate matter that flowed into the particulate matter filter 4 during the prescribed amount of time and the increase amount Vr by which the amount of particulate matter accumulated in the particulate matter filter 4 increased during the prescribed amount of time) does not change when the NOx trapping catalytic converter becomes deteriorated. Thus, in these temperature regions, the NOx trapping catalytic converter 3 would be mistakenly diagnosed as not yet deteriorated even if it already was deteriorated. Therefore, in this illustrated embodiment, the summation value Ve of the amount of particulate matter that flows into the particulate matter filter 4 during the prescribed amount of time is calculated and the increase amount Vr by which the amount of particulate matter accumulated in the particulate matter filter 4 increases during the prescribed amount of time is estimated only when the exhaust gas temperature is in a prescribed temperature region in which the conversion efficiency of the NOx trapping catalytic converter 3 changes greatly (markedly) when the NOx trapping catalytic converter 3 becomes deteriorated (i.e., in comparison to before the NOx trapping catalytic converter 3 became deteriorated) and in which a portion of the particulate matter accumulated in the particulate matter filter 4 is removed by oxidation resulting from nitrogen dioxide ($NO_2$) discharged from the NOx trapping catalytic converter 3. As a result, deterioration of the trapping catalytic converter can be determined accurately.

The estimation of the particulate matter accumulation estimating component is accomplished by Steps S5 to S7 of FIG. 2 and the detection of the particulate matter accumulation detecting component is accomplished by Steps S3, S4, S7, S8, S9, and S10 of FIG. 2.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A NOx trapping catalytic converter diagnostic apparatus comprising:
   a particulate matter accumulation estimating component configured to estimate an estimated amount of particulate matter accumulated in a particulate matter filter that is positioned downstream of a NOx trapping catalytic converter based on at least the particulate matter flowing into the particulate matter filter;
   a particulate matter accumulation detecting component configured to detect a detected amount of particulate matter accumulated in the particulate matter filter; and
   a deterioration determining component configured to determine if deterioration of the NOx trapping catalytic converter has occurred based on the estimated amount of accumulated particulate matter and the detected amount of accumulated particulate matter,
   the particulate matter accumulation estimating component being further configured to estimate the estimated amount of particulate matter that flows into and accumulates in the particulate matter filter during a prescribed amount of time based on an engine operating condition, the estimated amount of particulate matter corresponding to an increased amount of particulate matter increased in the particulate matter filter during the prescribed amount of time, and
   the particulate matter accumulation detecting component being further configured to detect the detected amount of particulate matter that flows into and accumulates in the particulate matter filter during the prescribed amount of time based on a detected pressure difference across the particulate matter filter, the detected amount of particulate matter corresponding to an increased amount of particulate matter increased in the particulate matter filter during the prescribed amount of time.

2. The NOx trapping catalytic converter diagnostic apparatus as recited in claim 1, wherein
   the deterioration determining component is further configured to determine that deterioration of the NOx trapping catalytic converter has occurred when a difference between the estimated amount of particulate matter estimated for the prescribed amount of time and the detected amount of particulate matter detected for the prescribed amount of time is larger than a determination threshold value.

3. The NOx trapping catalytic converter diagnostic apparatus as recited in claim 2, wherein
   the deterioration determining component is further configured to set the determination threshold value based on an amount of particulate matter that flows in for the prescribed amount of time.

4. The NOx trapping catalytic converter diagnostic apparatus as recited in claim 1, wherein
   the particulate matter accumulation estimating component is further configured to estimate the estimated amount of particulate matter that flows into the particulate matter filter for the prescribed amount of time when an exhaust gas temperature is in a prescribed temperature region, and
   the particulate matter accumulation detecting component is further configured to detect an increase amount by which the detected amount of accumulated particulate matter increases for the prescribed amount of time when the exhaust gas temperature is in the prescribed temperature region.

5. The NOx trapping catalytic converter diagnostic apparatus as recited in claim 4, wherein the particulate matter accumulation detecting component is further configured to set the prescribed temperature region as an exhaust gas temperature region in which a conversion efficiency of the NOx trapping catalytic converter changes when deterioration of the NOx trapping catalytic converter occurs and in which nitrogen dioxide flowing out of the NOx trapping catalytic converter causes particulate matter accumulated in the particulate matter filter to be removed by oxidation.

6. The NOx trapping catalytic converter diagnostic apparatus as recited in claim 4, wherein
the particulate matter accumulation detecting component is further configured to set the prescribed temperature region as a region from about 250° C. to about 450° C.

7. The NOx trapping catalytic converter diagnostic apparatus as recited in claim 1, wherein
the particulate matter accumulation estimating component is further configured to estimate the estimated amount of particulate matter that flows into the particulate matter filter for the prescribed amount of time based on a fuel injection quantity and an engine rotational speed.

8. A method of determining deterioration of a NOx trapping catalytic converter comprising:
estimating an estimated amount of particulate matter accumulated in a particulate matter filter that is positioned downstream of the NOx trapping catalytic converter based on at least the particulate matter flowing into the particulate matter filter;
detecting a detected amount of particulate matter accumulated in the particulate matter filter; and
determining deterioration of the NOx trapping catalytic converter based on the estimated amount of accumulated particulate matter and the detected amount of accumulated particulate matter,
the estimating of the estimated amount of particulate matter including estimating the estimated amount of particulate matter that flows into and accumulates in the particulate matter filter during a prescribed amount of time based on an engine operating condition, the estimated amount of particulate matter corresponding to an increased amount of particulate matter increased in the particulate matter filter during the prescribed amount of time, and
the detecting of the detected amount of particulate matter including detecting the detected amount of particulate matter that flows into and accumulates in the particulate matter filter during the prescribed amount of time based on a detected pressure difference across the particulate matter filter, the detected amount of particulate matter corresponding to an increased amount of particulate matter increased in the particulate matter filter during the prescribed amount of time.

9. The method as recited in claim 8, wherein
the determining of the deterioration of the NOx trapping catalytic converter includes determining deterioration has occurred when a difference between the estimated and detected amounts for the prescribed amount of time is larger than a determination threshold value.

10. The method as recited in claim 9, wherein
the determining of the deterioration of the NOx trapping catalytic converter includes setting the determination threshold value based on an amount of particulate matter that flows in for the prescribed amount of time.

11. The method as recited in claim 8, wherein
the estimating of the estimated amount of particulate matter for the prescribed amount of time is executed when an exhaust gas temperature is in a prescribed temperature region, and
the detecting of the detected amount of accumulated particulate matter includes detecting an increase amount by which the detected amount of accumulated particulate matter increases for the prescribed amount of time, which is executed when the exhaust gas temperature is in the prescribed temperature region.

12. The method as recited in claim 11, wherein
the detecting of the detected amount of accumulated particulate matter includes setting the prescribed temperature region as an exhaust gas temperature region in which a conversion efficiency of the NOx trapping catalytic converter changes when deterioration of the NOx trapping catalytic converter occurs and in which nitrogen dioxide flowing out of the NOx trapping catalytic converter causes particulate matter accumulated in the particulate matter filter to be removed by oxidation.

13. The method as recited in claim 11, wherein
the detecting of the detected amount of accumulated particulate matter includes setting the prescribed temperature region as a region from about 250° C. to about 450° C.

14. The method as recited in claim 8, wherein
the estimating of the estimated amount of particulate matter for the prescribed amount of time is based on a fuel injection quantity and an engine rotational speed.

15. A NOx trapping catalytic converter diagnostic apparatus comprising:
a NOx trapping catalytic converter arranged in an exhaust passage of an engine;
a particulate matter filter arranged downstream of the NOx trapping catalytic converter; and
a controller for controlling an operational state of the engine, the controller further comprising
particulate matter accumulation estimating means for estimating an estimated amount of particulate matter that flows into and accumulates in the particulate matter filter during a prescribed amount of time based on the operational state of the engine, the estimated amount of particulate matter corresponding to an increased amount of particulate matter increased in the particulate matter filter during the prescribed amount of time;
particulate matter accumulation detecting means for detecting a detected amount of particulate matter that flows into and accumulates in the particulate matter filter during the prescribed amount of time based on a detected pressure difference across the particulate matter filter, the detected amount of particulate matter corresponding to an increased amount of particulate matter increased in the particulate matter filter during the prescribed amount of time; and
deterioration determining means for determining if deterioration of the NOx trapping catalytic converter has occurred based on the estimated amount of accumulated particulate matter and the detected amount of accumulated particulate matter.

* * * * *